United States Patent [19]

Bergum et al.

[11] 4,070,528

[45] Jan. 24, 1978

[54] BATTERY HAVING POROUS INHERENTLY SEALABLE SEPARATOR

[75] Inventors: Bernard C. Bergum, Madison; Walter Lee Fong, Middleton, both of Wis.

[73] Assignee: ESB Incorporated, Philadelphia, Pa.

[21] Appl. No.: 572,968

[22] Filed: Apr. 30, 1975

[51] Int. Cl.² ............................................. H01M 6/46
[52] U.S. Cl. .................................. 429/152; 429/158; 429/162; 429/185
[58] Field of Search ..................... 136/111, 6 B, 6 S; 429/152–155, 129, 133, 162, 158, 185

[56] References Cited

U.S. PATENT DOCUMENTS

| | | | |
|---|---|---|---|
| 2,995,614 | 8/1961 | Krueger | 136/111 |
| 3,563,805 | 2/1971 | Deierhoi, Jr. | 136/111 |
| 3,770,504 | 11/1973 | Bergum | 136/111 X |
| 3,988,168 | 10/1976 | Bruneau | 429/129 |

*Primary Examiner*—Charles F. LeFevour
*Attorney, Agent, or Firm*—Gilbert W. Rudman; Gary V. Pack; Anthony J. Rossi

[57] ABSTRACT

An improved battery having an electrolyte permeable porous inherently sealable separator and intercell connector both extending beyond the periphery of the cell electrodes. A polymeric film material separator seals the intercell connector. The separators may extend beyond the intercell connectors and are sealed to adjacent separators.

6 Claims, 6 Drawing Figures

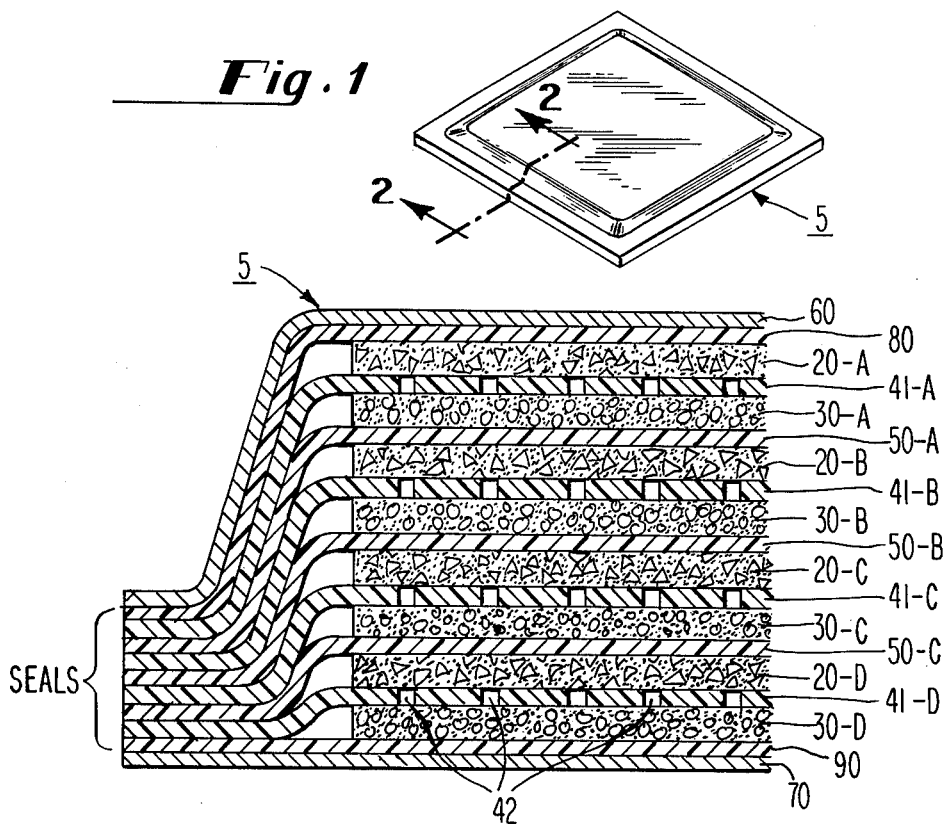
Fig. 1
Fig. 2
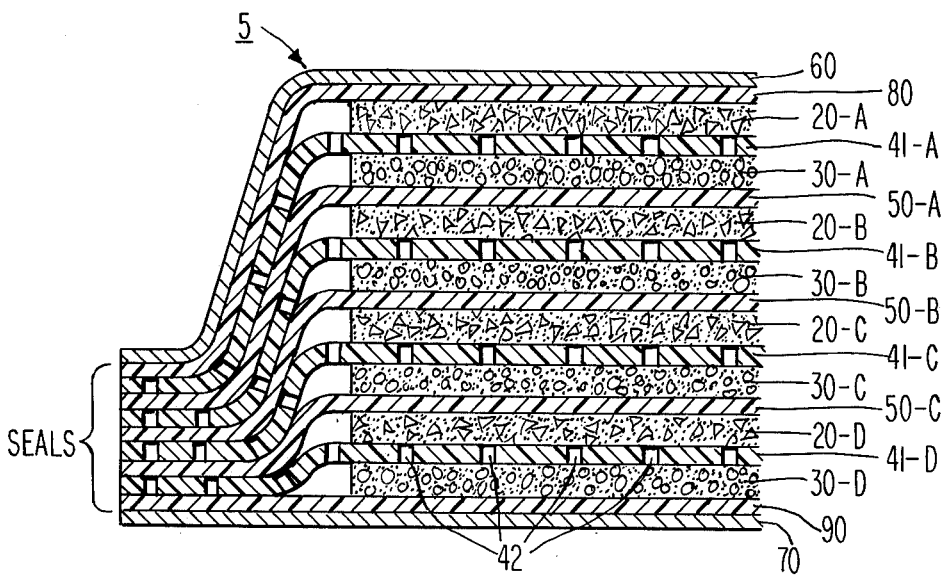
Fig. 3

BATTERY HAVING POROUS INHERENTLY SEALABLE SEPARATOR

BACKGROUND OF THE INVENTION

1. Field of the Invention

This invention relates to an improved battery having a porous inherently sealable electrolyte permeable separator. More particularly this invention relates to a non-conductive, porous, inherently sealable electrolyte permeable separator of a polymeric film positioned between the cell electrodes of the battery.

2. Description of the Prior Art

Previously, flat multicell batteries have generally utilized as electrode separator layers a deposit of gelled electrolyte which could be itself function both as an electrolyte and an electrode separator or, where the separator has been distinct from and in addition to the electrolyte, the separator is frequently made from the fibrous and cellulosic materials which are conventional in battery construction as well as from woven or non-woven fibrous materials such as polyester, nylon, polypropylene, polyethylene and glass.

An additional aspect of these previous batteries has been the use of a liquid impervious sealing means around each such separator. Heretofore, sealing has been accomplished by the addition of separate "adhesive members" to the battery or the addition to the fibrous separator of a separate coating of adhesive material.

In the improved battery of the present invention a novel separator structure is employed which (a) can utilize pores within and through an inherently sealable polymeric film separator when necessary to maximally immobilize the electrolyte contained therein thus minimizing electrolyte migration and which (b) permits sealing of the separator around its perimeter to provide a liquid and electrolyte impervious seal. Two separate necessary functions, i.e. electrode separation and cell sealing can thus be effected with a single mechanism, i.e., the novel inherently sealable separator.

SUMMARY OF THE INVENTION

The present invention is directed to an improved battery. If the battery is multicell, it comprises at least two cells and an intercell connector between each adjacent pair of cells. Each of the cells in the battery comprises a positive electrode, a negative electrode, and an electrolyte permeable separator between and in contact with the two electrodes. Each separator extends beyond the periphery of the cell electrodes adjacent thereto and is sealed around its perimeter faces to provide a liquid and electrolyte impervious seal.

In the single cell battery construction according to this invention the cell comprises a positive electrode, a negative electrode, an electrolyte permeable separator between and in contact with the two electrodes and a liquid impervious conductive layer on the side of each electrode opposite the separator. The separator and the liquid impervious layers extend beyond the periphery of the cell electrodes and the separator is sealed around its perimeter faces to the liquid impervious layers to provide a liquid and electrolyte impervious seal.

In the improved battery of this invention, whether single or multicell, the electrolyte permeable separator between the two electrodes of each cell consists essentially of a non-conductive, porous, inherently sealable polymeric film material.

DESCRIPTION OF THE DRAWINGS

FIG. 1 is a pictorial view of a sealed, multicell battery embodying the present invention;

FIG. 2 is a magnified fractional cross-section of a multicell battery encompassing one embodiment of this invention taken along line 2 — 2 of FIG. 1;

FIG. 3 is a magnified fractional cross-section of a multicell battery encompassing another embodiment of this invention taken along line 2 — 2 of FIG. 1.

DESCRIPTION OF THE INVENTION

FIG. 1 illustrates a flat, thin, multicell battery 5 which is approximately square although it may be rectangular or any other desired configuration. In the embodiments shown in FIGS. 2 and 3, the battery 5 includes a vapor impervious wrapper or envelope comprising wrapper layers 60 and 70 (as of steel, e.g.) which provide a liquid impervious seal around the cells and which function as current collectors. Use of metallic wrapper layers such as 60 and 70 is optional, however, as will be apparent from the description which follows.

The battery shown in FIG. 3 comprises four cells, A, B, C, and D, separated one from another by electrolyte impervious intercell connector layers, 50A, 50B, and 50C, each of which extends outwardly beyond the perimeter of the electrode of the cell structures and forms part of a peripheral, liquid impervious seal at each edge of the battery 5. A pair of inert, liquid impervious electrically conductive layers 80 and 90 are adhered to the terminal electrodes 20A and 30D of end cells A and D respectively. Wrapper layers 60 and 70 surround the cells on the outside of the conductive layers 80 and 90 respectively.

Figure 4:
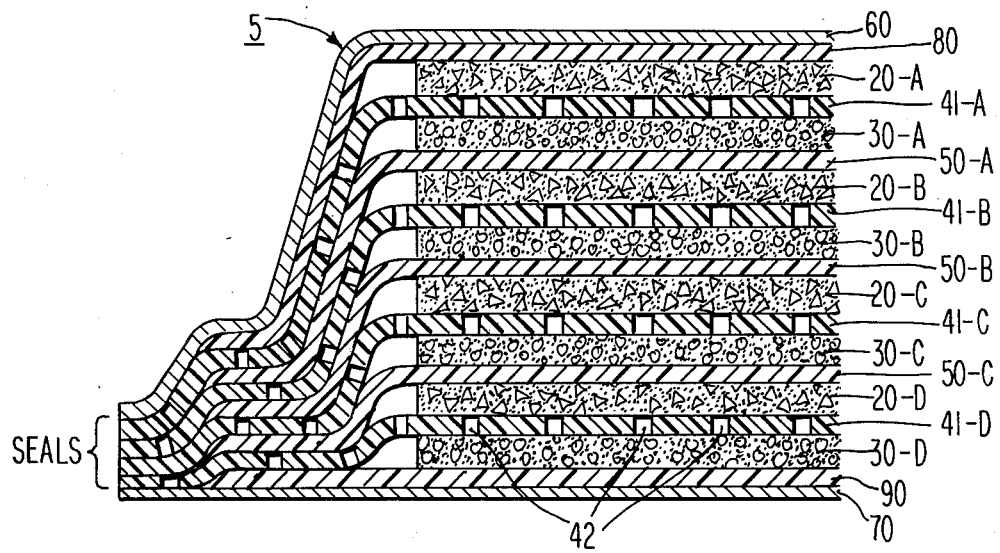
FIG. 4 is a magnified fractional cross-section of a multicell battery encompassing another embodiment of this invention taken along line 2 — 2 of FIG. 1.

In the batteries of FIGS. 2, 3, and 4, electrical bonds are provided at the confronting faces of all of the electrically conductive layers of the battery. Thus, in these embodiments shown in FIGS. 2, 3, and 4, the wrapper layers 60 and 70 are electrically bonded to the adjacent layers 80 and 90, respectively; the layers 80 and 90 are electrically bonded to the respective layers 20A and 30D. The positive electrodes 20A, 20B, 20C, and 20D are electrically bonded to the electrolyte containing layers 41A, 41B, 41C, and 41D respectively. The latter are in turn electrically bonded to negative electrode layers 30A, 30B, 30C, and 30D respectively. The latter negative electrode layers are electrically bonded to intercell connector layers 50A, 50 B, and 50C respectively. In turn, the intercell connector layers are electrically bonded to positive electrode layers 20A, 20B, and 20C respectively.

By establishing throughout the battery adherence, between respective confronting faces of the several electrically conductive layers forming the battery and thus providing the electrical bonds there between, a high performance rate battery may be achieved. If desired, a thin battery in which the thickness of each cell, together with an intercell connector layer does not exceed 5/100 inch may be produced.

The electrical bonds between the two confronting faces of the several layers of the multicell battery are achieved in various ways which are part dependent upon the compositions of the respective layers. For example, the conductive layer 80 is preferably formed of a plastic material which is impervious to electrolyte and which is electrochemically inert in the sense that it will not cause any undesirable chemical reactions within the battery during storage and use. Thus layer 80 can comprise a nonconductive matrix, as of a thermopolastic material such as polyvinyl chloride, which is so thoroughly impregnated with conductive particles such as carbon, as to exhibit a low resistance to the flow of current from one face to the opposite face thereof. In such case, the thermoplastic material may provide the desired bond between layers 60 and 80 by being directly bonded to the face of the steel wrapper layer 60 as by laminating. If desired, the electrical bond may be achieved by the aid of other bonding means, such as conductive adhesive, e.g., metal filled epoxies.

The positive electrodes 20 may comprise particles of the electrochemically positive active material contained in and dispersed throughout a binder matrix. The positive active material conventionally is divided into tiny particles so as to increase the ratio of total surface areas to weight in the active material and thereby increase the rate at which the electrochemical reactions can occur by increasing the surface areas where they occur. The binder increases the electronic conductivity and the structural integrity within the electrodes and may also serve to electrically bond the electrode to conductive layer 80. Since electrolytes must have access to the surface of the active material particles, the electrode must be made sufficiently porous so that the electrolyte may diffuse throughout the electrode rapidly and thoroughly. Preferably the pores in the electrode are produced by the evaporation of liquid during the construction of the electrodes. The evaporating liquid may be part of a dispersion binder system in which the solid binder contained in the finally constructed electrode comprises tiny particles of binder material dispersed throughout and not dissolved in the liquid while the electrode is being constructed, or the evaporating liquid may be part of a solution binder system in which the solid binder contained in a finally constructed electrode is dissolved in a liquid which is later evaporated. The porosity of the positive electrodes may be increased as the discharge rate desired in the battery is increased. Electrodes may also be constructed using combinations of the dispersion and solution systems. Alternatively, the pores may be produced by the dissolving of a solid which was present during construction of the electrode or by passing gases through or generating gases within the electrodes at controlled rates during electrode construction. The positive electrodes 20 may, and preferably will, also contain amounts of good electrical conductive such as carbon or graphite to improve the electrical conductivity between the active material particles, the positive active material particles themselves generally being relatively poor conductors of electricity. The conductivity of the active material particles together with the conductivity of the binder itself will influence the amount of conductors added to the electrode. The electrodes 20 may also contain if desired, small amounts of additional ingredients used for such purposes as maintaining uniform dispersion of active material particles during electrode construction, aiding the diffusion of the electrolyte through the pores of the finely constructed electrodes, controlling viscosity during processing, controlling surface tension, controlling pot life, or for other reasons.

The negative electrodes 30 may comprise for example spray or vapor deposits of metals or may comprise tiny particles of metals contained in and dispersed throughout a binder matrix. If the negative electrodes utilize a binder matrix, in general the same considerations regarding that matrix apply to the negative electrodes as do for the positive electrodes except that no electrical conductor may be needed to achieve desired electrical conductivity between the active material particles since the negative active material particles generally are better conductors than are the positive materials. When the negative electrodes utilize a binder matrix, the binder system need not be the same as the one used in the positive electrodes and even if it is, the proportions of binder, active material particles, and other ingredients in the negative electrodes may have a different optimum than the proportions of analogous ingredients in the positive electrode. The initial porosity of the negative electrodes may sometimes be less than that of a positive electrode since the negative electrode discharge reaction products are sometimes dissolved in the battery electrolytes. The porosity of the negative electrodes may be increased as the discharge rate in the battery is increased. The negative electrodes 30 may also comprise thin sheets of foils for electrode deposits of electrochemically negative material.

In the improvement of this invention as manifested in a multicell battery, there is between the two electrodes in each cell an electrolyte permeable, non-conductive, porous, inherently sealable separator 41 in accordance with the invention. The pores of the inherently sealable separator can serve to retain the electrolyte in relatively stable position thus reducing the possibility of electrolyte migration. However, when larger pores are present the electrolyte may be immobilized with gelling agents known to those skilled in the art. The separators 41 extend outwardly beyond the perimeter and periphery of the electrodes in each cell and are sealed, utilizing the property of their inherent sealability, around their own perimeter faces to provide a liquid impervious seal which effects the prevention of electrolyte migration and leakage within the battery. The pores 42 which are present in the separator 41 may be present only in that portion of the separator which is co-extensive with the cell electrodes (see FIG. 2) or the pores of the separator 41 may extend beyond the periphery of the cell electrodes, e.g., whereby the entire separator is porous (see FIG. 3). In either case the electrolyte impervious intercell layers 50 may be extended outwardly beyond the periphery of the electrodes of the cell, and the separators 41 may be sealed by any appropriate means, to the adjacent intercell connector layers 50 and to conductive layers 80 and 90 outside the periphery of the cell electrodes to form a liquid impervious seal which both prevents electrolyte migration or leakage outside the battery while at the same time producing a liquid impervious seal around each individual cell. In FIG. 4 the separators 41 extend outwardly beyond the peripheral seal formed between separator 41 and connector layer 50 and are again sealed by an appropriate means this time to one another, i.e., 41 to adjacent 41 thus forming a second or double liquid impervious seal. This may be accomplished whether pores of the separator are co-extensive with the electrodes or whether they extend beyond the periphery of the electrodes. In addition to the bi-functional nature of the porous separator it can be seen that by means of a single mechanism, i.e., a porous inherently sealable separator, stable positioning of electrolyte within the cell can be maintained when necessary without the need for a distinct and separate fibrous or cellulosic separator which would not be in and of itself capable of performing the necessary functions of the separator of the instant invention, i.e., separation of the electrodes and the provision of a liquid impervious seal around the perimeter of a cell to prevent electrolyte migration and leakage within the battery, without the necessity of adding or applying an additional adhesive material to the surface of the separator. This latter result is effected in the improvement in the instant invention due to the inherent sealable nature of the separator itself.

In the event that the battery is of a single cell rather than a multicell construction (see FIG. 5) inert liquid impervious electrically conductive layers 80 and 90 may be used to terminate the positive and negative electrodes, with the porous separator 40 extending beyond the periphery of the cells electrodes and being sealed to the conductive layers around its perimeter faces to provide the liquid and electrolyte impervious cell seal.

The separator of this invention may be made of any material which is: (a) inherently sealable, i.e., capable of being sealed to an abutting surface without the addition or application thereto of a separate adhesive material or composition; (b) a polymeric film, i.e., one which can be made, for example, by such methods as casting, extrusion, laminating, calendaring, skiving, co-extrusion, or blowing: (c) porous, i.e., the film material must be susceptible to pore formation prior to its insertion and use within the cell; and (d) electronically non-conductive. The non-conductive separator may, therefore, be made from a wide variety of porous polymeric film materials whether homogeneous or composite so long as they are inherently sealable by means of an energy flux, i.e., those materials whose activatable (inherently sealable) sites can be activated by such means as heat application, particle irradiation, ultrasonic, pressure, dielectrics, and the like.

As stated previously, useful inherently sealable polymeric films can be made by methods such as casting, extrusion, calendaring, skiving, co-extrusion, or blowing. Various procedures are used in extrusion of useful homogeneous films from a melt. Inherently sealable composite structures are made by methods such as co-extrusion, or sealable surface coating of the entire film surface, e.g., knife coating and curtain coating. The blown film technique is commonly used for processing films such as polyethylene, ionomers, nylons, polyvinyl chloride, and polyvinylidene chloride. Calendaring is commonly used for films such as polyvinyl chloride. Casting of a number of thermoplastic and thermoset resins can be carried out by a variety of procedures. Solvent casting of polyvinyl chloride and polyesters cast from resins are examples. Also useful are thermosetting materials such as: phenolics, polyurethane film, rubbers, epoxy films and silicones.

Once the polymeric film is made it can then be converted into its useful porous separator form by any of a variety of art-known means such as: mechanical means; puncturing with needles, burning with needles, punching with a die, post stressing; electromagnetic means; laser, electrostatic discharge; chemical means; solvent attack and selective leaching. Of the various porous separator materials formed by any of these perforating means, those which have pores which are approximately perpendicular to the surface of the polymeric material are most preferred, i.e., those materials perforated by mechanical methods and electromagnetic means. The pores of the separator should generally be vertical to the plane of the separator with any horizontal pores being shorter then the width of the perimeter seal. It should be kept in mind that the function of a battery separator is to interpose a gap between the positive and negative electrodes and may provide an electrolyte reservoir. The gap between the positive and negative electrodes prevents direct electronic paths in the internal surface. The electrolyte reservoir provides the ionic path which is essential for the proper functioning of electrode reactions. The pores or perforations within the separator of this invention therefore serve to retain the electrolyte thus allowing ionic transfer between the electrodes. It is understood, of course, that those areas of the separator of this invention which are utilized to form the liquid impervious seal do not contain electrolyte. The number of pores made in the separator may vary from a few per square inch to in excess of 1,000,000 per square inch. While it is preferred to have a large number, there is obviously a relationship between the number of pores and their size. Thus, porous materials such as "Celgard" may have over 1,000,000 pores per square inch while materials produced by mechanical methods may be limited to a few hundred per square inch. The preferred material would be a porous material having a large ratio of open areas to continuous film surface. This would allow the most electrolytes to be retained, a higher rate of ion transfer and thus better overall battery performance. While size and number of pores present is not critical, pore sizes of from about 0.1 micron to about 0.3 inch are preferred and pore densities of from about $1 \times 10^6$ to about 10 per square inch are preferred. In one preferred embodiment of this invention a co-extruded film consisting essentially of EVA-nylon — EVA is perforated to produce a separator with 700 holes per square inch. In another preferred embodiment a polyethylene film having 700 holes per square inch is used.

In the batteries of FIGS. 2, 3, and 4, a liquid impervious seal is created around the periphery of the cell electrodes by simply sealing the separators to conductive layers 80 and 90, and/or layers 50 at any point beyond the periphery of the cell electrodes. Sealing may be accomplished by any suitable means depending upon the inherent sealing mechanism of the particular separator material employed. Useful sealing means will thus include heat sealing, particle irradiation, pressure, dielectrics, and ultrasonics.

Figure 5:
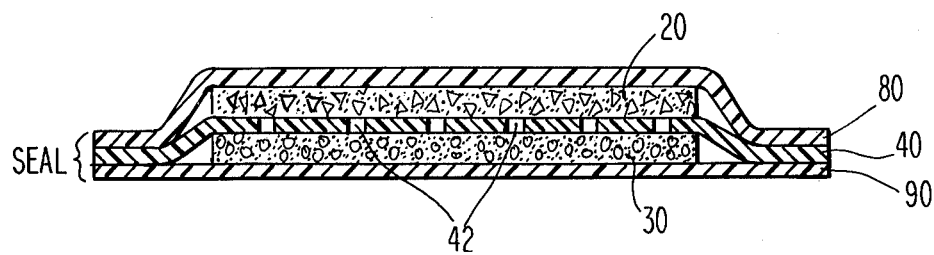
FIG. 5 is a magnified fractional cross-section of a single cell battery encompassig another embodiment of this invention.
Figure 6:
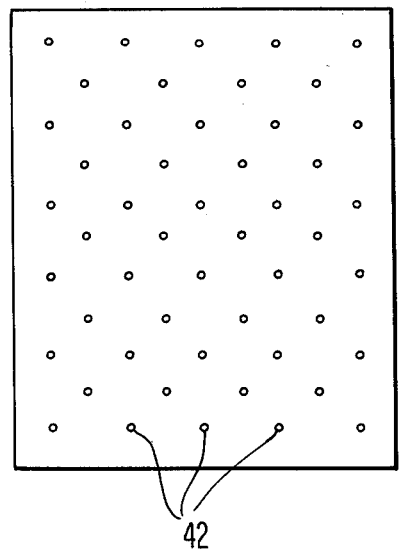
FIG. 6 illustrates a plane view of a section of separator for use in the battery of this invention.

The perforation pattern in the separators 40 and 41 can, if desired, be arranged to enhance the sealability by designing the hole pattern with a maximum distance between holes from the inside of the seal area to the outside of the cell, e.g., a diamond pattern rather than a square pattern (see FIG. 5).

In the multicell batteries of FIGS. 2, 3, and 4, there is between each consecutive pair of cells an impervious intercell connector 50 which may include any of several different embodiments. Regardless of the specific embodiment, the impervious intercell connector 50 must meet three essential requirements: it must be impervious to electrolyte of the battery so that one cell may be sealed off from the next; it must provide some means by which electrical current may be conducted between the positive electrode in one cell and the negative electrode in the next cell; and it must not create any undesired electrochemical reactions with the electrodes or other components of the battery.

The particular embodiment of the impervious intercell connector shown in FIGS. 2, 3, and 4 may be a sheet of electrically conductive plastic. The impervious intercell connector 50 may also be a combination of an electrically non-conductive member such as plastic, with one or more members of electrically conductive material extending around the edge of or through the non-conductive member to conduct electrical current between the positive electrode in one cell and the negative electrode in the next consecutive cell.

The multicell batteries of FIGS. 2, 3, and 4, are also provided with conductive layers 80 and 90 for conducting electrical current between the terminal electrodes (20A and 30D) and the exterior of the vapor impervious wrapper layers 60 and 70. While the vapor impervious wrapper layers 60 and 70, which also act as current collectors, should preferably extend beyond the cells of the battery, these current collectors may be limited in size if desired so that they extend across some of the outer conductor layers 80 and 90 which they are electrically bonded. FIGS. 2, 3, and 4 illustrate a laminate of metal layer 60 with a sheet of an electrically conductive plastic layer 80, and a second laminate of a metal layer 70 with an electrically conductive plastic layer 90. Such laminated layers may be formed by adhering the metal layers through the aid of heat and pressure. Alternatively, the current collectors may be sprayed, vacuum deposited or electro-deposited upon the plastic layers.

In such laminated constructions, the conductive plastic members 80 and 90 function as the current conductors and liquid impervious containers. The metal layers 60 and 70 function as vapor impervious wrappers as well as the means for collecting current. Based upon the recognition that the metal layers 60 and 70 may be bonded directly to the conductive plastic members 80 and 90 respectively, through the application of heat and pressure, the laminated assemblies of layers 80 and 90 with metal layers 60 and 70 respectively comprise units each of which functions simultaneously as a current conductor, the outside wrapper or vapor barrier, the liquid barrier, and means of collecting current. The metal layers and the conductive plastic layers each serve as moisture barriers thus providing, in combination, a vapor and liquid barrier outside each end cell, and thereby contributing to the extended shelf life in the resultant battery.

While it is preferred to employ the LeClanche electrochemical system (comprising manganese dioxide positive active material, zinc negative active material, and an electrolyte comprising ammonium chloride and/or zinc chloride), the battery 5 may employ a wide variety of positive and negative electrode materials and a wide variety of electrochemical systems including both primary and secondary. Among the positive electrode materials are such commonly used inorganic metal oxides as manganese dioxide, lead dioxide, nickel oxyhydroxide, mercuric oxide, and silver oxide; inorganic metal halides such as silver chloride and lead chloride; and organic materials capable of being reduced to such as dinitrobenzene and azodicarbonamide compounds. Among the negative electrode materials are such commonly used metals as zinc, aluminum, magnesium, lead, cadmium, and iron. The battery of this invention may with appropriate electrodes, employ the electrolytes commonly used in the LeClanche system (ammonium chloride and/or zinc chloride), various alkaline electrolytes such as the hydroxides of potassium, sodium, and/or lithium, acidic electrolytes such as sulfuric or phosphoric acid, nonaqueous electrolytes, the electrolytes of course being chosen to be compatible with the positive and negative electrodes.

Among the wide variety of electrochemical systems which may be used in the battery 5 are those in which the positive electrodes comprise manganese dioxide, the negative electrodes comprise metals such as zinc, aluminum, or magnesium, the electrolyte substantially comprises an acidic solution of inorganic salts. Another commonly known system useful in the battery 5 is the alkaline manganese system in which the positive electrodes comprise manganese dioxide, the negative electrodes comprise zinc and the electrolyte substantially comprises a solution of potassium hydroxide. Other aqueous electrolyte systems including those of nickel-zinc, mercury-zinc, mercury-cadmium, and nickel-cadmium may also be used. Systems employing organic positive electrodes and acidic electrolytes may also be used, including rechargeable systems using azodicarbonamide compound electrodes and LeClanche electrolyte.

The foregoing detailed description has been given for clarity of understanding only and no unnecessary limitations are to be understood therefrom. The invention is not limited to exact details shown and described for obvious modifications will occur to one skilled in the art.

The embodiments of the invention in which an exclusive property or privilege is claimed is defined as follows:

1. An improved battery comprising in combination
   a. at least one cell, each cell comprising the combination of
      1. a positive electrode,
      2. a negative electrode, and
      3. an electrolyte permeable separator between the electrodes, the separator extending beyond the periphery of the electrodes; and
   b. an intercell connector between each adjacent pair of cells, the connector extending outwardly beyond the periphery of the cell electrodes;
   wherein the improvement comprises having each electrolyte permeable separator consisting essentially of nonconductive, porous, inherently sealable polymeric film material and sealing the separator around its perimeter to the intercell connector, without applying an adhesive material to the surface of the separator periphery, to form a liquid and electrolyte impervious seal.

2. An improved battery according to claim 1 wherein the polymeric film material is homogeneous.

3. An improved battery according to claim 1 wherein the polymeric film material is a composite structure.

4. An improved multicell battery according to claim 1 wherein the separators extend outwardly beyond the peripheral separator-intercell connector seals and are there sealed to the adjacent separators.

5. An improved multicell battery according to claim 4 wherein the polymeric film material is homogeneous.

6. An improved multicell battery according to claim 4 wherein the polymeric film material is a composite structure.

* * * * *